July 24, 1923.
J. MASIN
BEARING
Filed Dec. 2, 1922
1,462,716
Fig. 1
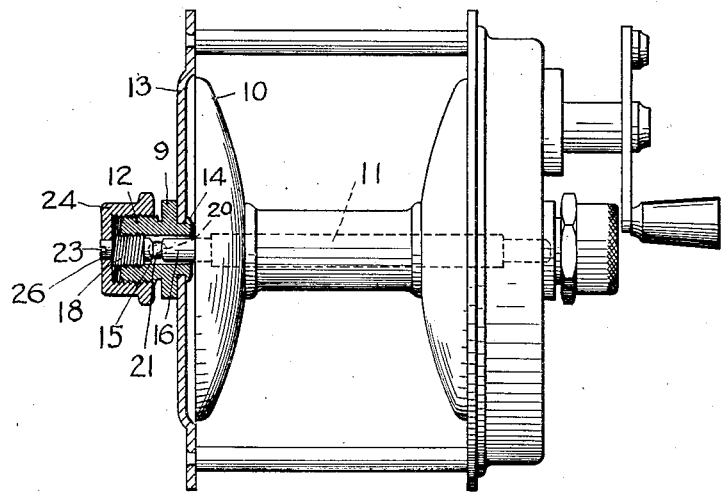
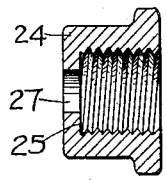
Fig. 2
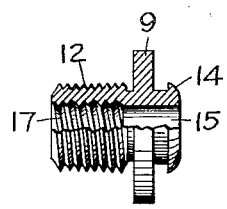
Fig. 3
Fig. 4
INVENTOR
Joseph Masin
BY
Harry Jacobson
ATTORNEY Patented July 24, 1923.

1,462,716

UNITED STATES PATENT OFFICE.

JOSEPH MASIN, OF NEW YORK, N. Y.

BEARING.

Application filed December 2, 1922. Serial No. 604,472.

*To all whom it may concern:*

Be it known that I, JOSEPH MASIN, a citizen of the United States, and a resident of the city of New York, in the county of New York and State of New York, have invented certain new and useful Improvements in Bearings, of which the following is a specification.

This invention relates to adjustable bearings, and particularly to that type adapted for use in instruments carrying light loads, where even, accurate rotation is required.

One of the objects of this invention is the provision of an adjustable, substantially frictionless bearing, adapted to be readily adjusted and to be locked in the adjusted position.

A further object of this invention is the provision of means for protecting the bearing adjusting means against accidental displacement, while allowing ready access thereto at all times.

A still further object of this invention is the provision of a simple, accurate, self-centering, freely rotatable bearing in which the parts subjected to wear are easily accessible, and which parts may be readily replaced when desired.

For the attainment of the above and other objects, as will appear as the description progresses, I employ the means shown in their preferred forms in the accompanying drawings, in which, Fig. 1 is a front elevation and partial section of my improved bearing applied to a fishing reel, the size of the bearing being exaggerated for clearness.

Fig. 2 is a vertical section of the locking nut for said bearing.

Fig. 3 is a front elevation of the adjusting screw, and Fig. 4 is a front elevation and partial section of one of the bearing members.

Certain instruments require the accurate rotation of some of the parts thereof about a substantially invariable axis. Said rotating parts must therefore be accurately balanced about an exact center line, which cannot change its position appreciably during the rotation. A fishing reel is such an instrument, and I have illustrated the improved bearing I have devised to meet the requirements above mentioned, in connection with the rotating spool of a fishing reel.

My improved bearing is preferably used at both ends of a horizontal shaft, though only one is shown in detail. But the bearings at both ends of the shaft being alike, a description of one will suffice for both.

Said fishing reel spool 10 is mounted on the shaft 11 for rotation therewith. A bearing member 12 is secured in the frame end 13 of the reel preferably by flanging the inner end 14 of said member over the inside of said frame end, a collar portion as 9 engaging the outer surface of said frame end. An opening as 15 in said member 12 is made preferably greater in diameter than the end 16 of the shaft 11 and is adapted to receive said end. It will be noted therefore that the shaft does not touch the walls of the opening 15. A second hole 17 preferably coaxially disposed with relation to the opening 15 is made in said member 12, is threaded preferably with a left-hand thread, and is prolonged to meet the opening 15. Into the threaded hole 17 is inserted the adjusting screw 18. The end of said screw, as well as the end of the shaft 11, each has a spherical depression as 19 and 20 respectively made therein, said depressions being adapted to receive the ball 21 therein.

At the termination of the threaded portion of said screw 18, a shoulder as 22 is formed, while the outer extremity of said screw is slotted as at 23. For locking said screw 18 in the adjusted position thereof, and for protecting said screw against accidental displacement, a cap nut 24 is screwed on to the outside of the member 12 by means of a right hand thread, to a position wherein the inner flat surface 25 of said cap nut engages the shoulder 22 of said screw. The head 26 of said screw in the locked position thereof passes through a suitable opening as 27 in said nut so that the slot 23 becomes readily accessible at all times.

It will be seen that, owing to the opposite directions in which the threads on the nut and on the screw are made, tightening the nut does not affect the adjustment of said screw, but on the contrary serves to lock the screw in its adjusted position, while the loosening of said nut slightly, frees the screw for adjustment. For adjusting the screw after the nut has been loosened, said screw 18 is manipulated from the outside of the bearing by means of the slot 23 to a position wherein the desired degree of freedom of rotation and pressure is attained.

It will also be seen that the shaft 11 always tends to assume a position in which the axis thereof is coincident with a line passing through the centers of the balls at the ends thereof, whereby the bearing is in effect, a self-centering bearing. If the ball becomes worn, it may be readily and inexpensively replaced with a new one, thereby enabling the bearing to retain its accuracy over a long period.

I claim:

1. A bearing comprising a bearing member, an adjusting screw movable in said member, a constricted slotted head on said screw, and a cap lock nut having an opening in the end wall thereof to receive said head, screwed to the outside of said member and adapted to engage said adjusting screw at the juncture of said head and said screw by abutting thereagainst when said nut is tightened on said member.

2. In a bearing, the combination with a shaft having a spherical depression in the end thereof, of a ball, an adjusting screw having a spherical depression in the end thereof for receiving said ball, a left-hand thread on said screw, a shoulder at the end of said thread, a cap nut having an opening therein adapted to receive the end of said screw and to engage said shoulder for locking said screw in position, and hollow means threaded with a right-hand thread on the outside and with a left-hand thread on the inside for carrying said nut and said screw and for receiving said ball and the end of said shaft..

3. In a bearing, a left-hand screw having a depression in the end thereof, a shoulder on said screw, a ball adapted to enter said depression, a slotted head on said screw, a hollow bearing member threaded on the inside to receive said screw, a collar portion on said member, a right-hand threaded cap nut adapted to be screwed on the outside of said member and having an opening therein adapted to receive the head of said screw and to engage said shoulder.

4. In a fishing reel bearing, a shaft, an adjusting screw adjustably connected to the end of said shaft, a slotted head on said screw smaller in diameter than the remainder of said screw, means for carrying said adjusting screw, a cap nut screwed to the outside of said carrying means, and an end wall on said nut having a central opening therein adapted to receive said screw head and to engage said screw between said head and the threaded portion of said screw for locking said screw in adjusted position.

5. In a fishing reel, a frame, a shaft having a spherical depression in the end thereof, a bearing member secured to said frame and adapted to receive without touching the end of said shaft, an adjusting screw screwed into said member, and having in the end thereof a spherical depression of the same radius as said depression in said shaft, a ball of the same radius as said depressions carried between the ends of said screw and said shaft, and a nut threaded in an opposite direction to said screw screwed on the outside of said member and adapted to engage said screw.

6. In a bearing, a bearing member, a thread on the outside of said member, a thread opposite to said first mentioned thread on the inside of said member, an adjusting screw having a depression in the end thereof engaging said second thread, a ball adapted to enter said depression, a shoulder near the end of said screw, and a nut adapted to be screwed on the outside of said member and to engage said shoulder for locking said screw in position.

JOSEPH MASIN.